US007252001B2

(12) United States Patent
Boletis et al.

(10) Patent No.: US 7,252,001 B2
(45) Date of Patent: Aug. 7, 2007

(54) THREE AXIS ACTIVE MAGNETIC LEVITATION FOR INERTIAL SENSING SYSTEMS

(75) Inventors: Alexis Boletis, Lugano (CH); François Barrot, Chavannes (CH); Roland Moser, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 135 days.

(21) Appl. No.: 10/526,140

(22) PCT Filed: Sep. 2, 2003

(86) PCT No.: PCT/CH03/00597

§ 371 (c)(1),
(2), (4) Date: Apr. 12, 2005

(87) PCT Pub. No.: WO2004/021016

PCT Pub. Date: Mar. 11, 2004

(65) Prior Publication Data
US 2005/0204817 A1 Sep. 22, 2005

(30) Foreign Application Priority Data
Sep. 2, 2002 (CH) ................................. 00481/02

(51) Int. Cl.
*G01P 15/00* (2006.01)
(52) U.S. Cl. ................................. 73/514.17; 73/514.31
(58) Field of Classification Search ............. 73/514.17, 73/514.18, 514.19, 514.31
See application file for complete search history.

(56) References Cited

U.S. PATENT DOCUMENTS

| 2,919,583 | A |   | 1/1960 | Parker |            |
|-----------|---|---|--------|--------|------------|
| 3,023,626 | A | * | 3/1962 | Bonnell | 73/514.31 |
| 3,272,016 | A | * | 9/1966 | Mullins, Jr. | 73/514.17 |
| 3,491,600 | A |   | 1/1970 | Kasparian, Jr. |      |
| 3,508,445 | A | * | 4/1970 | Gagnon et al. | 73/514.12 |
| 4,344,235 | A | * | 8/1982 | Flanders | 33/366.12 |
| 4,891,983 | A | * | 1/1990 | Stewart | 73/514.17 |
| 5,789,677 | A | * | 8/1998 | McEachern | 73/514.19 |

FOREIGN PATENT DOCUMENTS

EP 1 077 379 2/2001

* cited by examiner

Primary Examiner—Helen Kwok
(74) Attorney, Agent, or Firm—Nixon & Vanderhye P.C.

(57) ABSTRACT

The invention relates to an inertial sensor based on the magnetic levitation of an inertial mass comprising an active magnetic bearing unit arranged in such a way as to levitate the inertial mass and characterized by the fact that it furthermore comprises additional active magnetic bearings units arranged in such a way as to control the position of said inertial mass along three independent axis and to create, for any of said independent axis, restoring forces that can be oriented in any of the two directions of these independent axis.

12 Claims, 7 Drawing Sheets

THREE AXIS ACTIVE MAGNETIC LEVITATION FOR INERTIAL SENSING SYSTEMS

This application is the U.S. national phase of international application PCT/CH2003/000597 filed 2 Sep. 2003 which designated the U.S. and claims benefit of PCT/CH02/00481, dated 2 Sep. 2002, the entire content of which is hereby incorporated by reference.

FIELD OF INVENTION

The present invention relates to non-contact inertial sensing systems, that is to say inertial sensors where the inertial mass is never in contact with the rest of the instrument. The contact less suspension of said mass is assured by magnetic bearings.

BACKGROUND OF INVENTION

Current inertial sensing systems such as seismometers, accelerometers, gravimeters and tiltmeters are based on the relative displacement between an inertial mass and the base of the instrument when the said base is subject to an external disturbance (vibration, modification of the "g" level, angle); and gyroscopes, which are another kind of inertial sensing systems, are made of an inertial mass which is rotated about one of its axis of inertia and the measurement principle relies on the relative movement between the said axis and the base of the instrument, or on the force generated by the said axis on the base of the instrument, when the said base is subject to an external movement.

All those inertial sensing systems will be limited by the friction between the inertial mass and the base of the instrument.

Indeed this friction will be responsible of imprecisions in the measurements, of wear between the mechanical parts in contact and it might also lead to failure due to mechanical fatigue.

In addition, inertial sensing systems, such as seismometers in seismology or inclinometers in civil engineering, are often placed to monitor structures or machines and the power consumption of such systems is sometimes a critical factor.

In seismology, it is relevant to study seismic waves within the following ranges:

Frequencies: From 1 mHz to 100 Hz
Accelerations: From 1 nano g to 5 g

Given this wide spread both of the relevant frequencies and the relevant accelerations that have to be recorded and analyzed, several classes of measuring instruments have been developed:

Short Period seismic sensors
Long Period seismic sensor
Broad band seismic sensors
Very broad band seismic sensor All the corresponding products presently commercialized are designed around a damped mechanical mass-spring system made up of a mass detector linked both to a damping mechanism and, with a spring, to the frame of the instrument.

In the case of a seismic excitation, the frame of the seismometer follows the ground movement while the mass used as a detector, which we shall designate as the seismic mass, tends to remain in its initial position, thus moving relatively to the frame.

In the process the length of the spring changes and the displacement in relation to the frame can be measured as a function of time.

The response to a seismic excitation of instruments built according to this principle solely derives from the mechanical characteristics of such a damped spring mass system, i.e. the elastic constant k of the spring and the damping constant d.

Since, however, the spring characteristic k is not precisely constant upon the whole range of possible spring deformations, and is temperature dependant, some of the most recent seismometers are equipped with an electromagnetic counterforce system fed by a feed back loop, limiting spring deformations within a small range where k is assimilated to a constant value.

This design, however, does not eliminate distortions caused by spring inertia and friction and, for a given instrument, it is not possible to change its parameters k and d, a fact which limits its use to a chosen range of accelerations and frequencies.

In order to eliminate these shortcomings, some new designs have been recently patented: they use either magnetic or electrostatic forces or the force resulting from a special property of a super-conducting loop, called the Meismer effect, in order to levitate a seismic mass. The levitation is obtained through the action of one or several retroactive loops commanded by optical or capacitive sensors measuring the movements of the seismic mass in relation to the frame of the instrument.

Today's high quality seismometers and based on expensive multi-axis spring-damper elements with complex compensation systems. Electrostatic levitation of large spheres in high vacuum is the principle of some high precision gyroscopes.

A three axis active magnetic suspension seismometer, described in the U.S. Pat. No. 5,565,665 issued to Biglari et al., shows a limited sensitivity, caused by the sensing system, and a non-symmetric behavior of the vertical axis. In addition an upward acceleration can not be counter balanced since there are no electromagnets placed below the seismic mass.

In U.S. Pat. No. 4,947,067 issued to Habermann et al., a three axis magnetic suspension is presented but for the purpose of a vibrator/dampener and not for the purpose of an inertial sensor.

In U.S. Pat. No. 5,024,088 issued to Komatsu et al., the described accelerometer shows a complex inertial mass and a non optimal arrangement of the coils resulting in a hyperstatic system.

Magnetic suspension and rotation of small spheres was done by J. Beams, but with only one controlled axis and the purpose was to create high centrifugal fields.

Other Prior Art References:

Patent Documents
U.S. Pat. No. 5,955,800
U.S. Pat. No. 5,357,803
U.S. Pat. No. 5,224,380
U.S. Pat. No. 6,363,035
U.S. Pat. No. 5,983,699

Other Publications
J. W. Beams, J. L. Young, J. W. Moore, the Production of High Centrifugal Fields, Journal of Applied Physics, Vol. 17, November, 1946.

J. W. Beams, Magnetic Suspension for Small Rotors, The Review of Scientific Instruments, vol. 21, No 2, 182-184, February, 1950.

E. F. Kinsey, J. W. Beams, M. J. Saunders, The Magnetically-Suspended Free Gyroscope, Naval Ordnance Research Laboratory, University of Virginia, December, 1951.

J. W. Beams, Magnetic Bearings, Automotive Engineering Congress, Detroit, Mich., January, 1964.

W. J. Bencze, Y. Xiao, D. N. Hipkins, B. W. Parkinson, G. F. Franklin, An Electrostatic Suspension and Orientation Control System for the Gravity Probe B Relativity Mission's Science Gyroscope, 3rd MOVIC, September 1996, Chiba, Japan.

SUMMARY OF THE INVENTION

The present invention is based on the magnetic levitation of an inertial mass to create highly sensitive non-contact inertial sensing systems. It relates to an inertial sensor based on the magnetic levitation of a ferromagnetic spherical or cylindrical inertial mass and comprising:

Six electromagnets diametrically disposed in pairs along three orthogonal axis, said pairs of electromagnets constituting means for levitation and differential actuation of said inertial mass Six position sensors diametrically disposed in pairs along three orthogonal axis, said pairs of position sensors constituting means for differential measurements of the position of said inertial mass wherein said pair of electromagnets, together with said pairs of position sensors and said inertial mass, constitute an active magnetic bearing which give the means for:

controlling the position of said inertial mass along three independent axis creating, for any of said independent axis, restoring forces that can be oriented in any of the two directions of said independent axis wherein said active magnetic bearing is enclosed in an outer frame made of homogeneous ferromagnetic material; said outer frame constituting a magnetic shielding of said inertial sensor, wherein said outer frame of said inertial sensor is hermetically sealed in order to offer the possibility of creating and keeping vacuum inside said outer frame, wherein a lock-in amplifier is used for the signal conditioning of said position sensors. There are various preferred embodiments. The following detailed description will better show all the advantages provided by the invention over the prior art sensors.

BRIEF DESCRIPTION OF THE DRAWINGS

For a greater understanding of the nature and objects of the invention, reference should be made to the following detailed description and the accompanying drawings, in which.

DETAILED DESCRIPTION OF THE INVENTION

Figure 1:
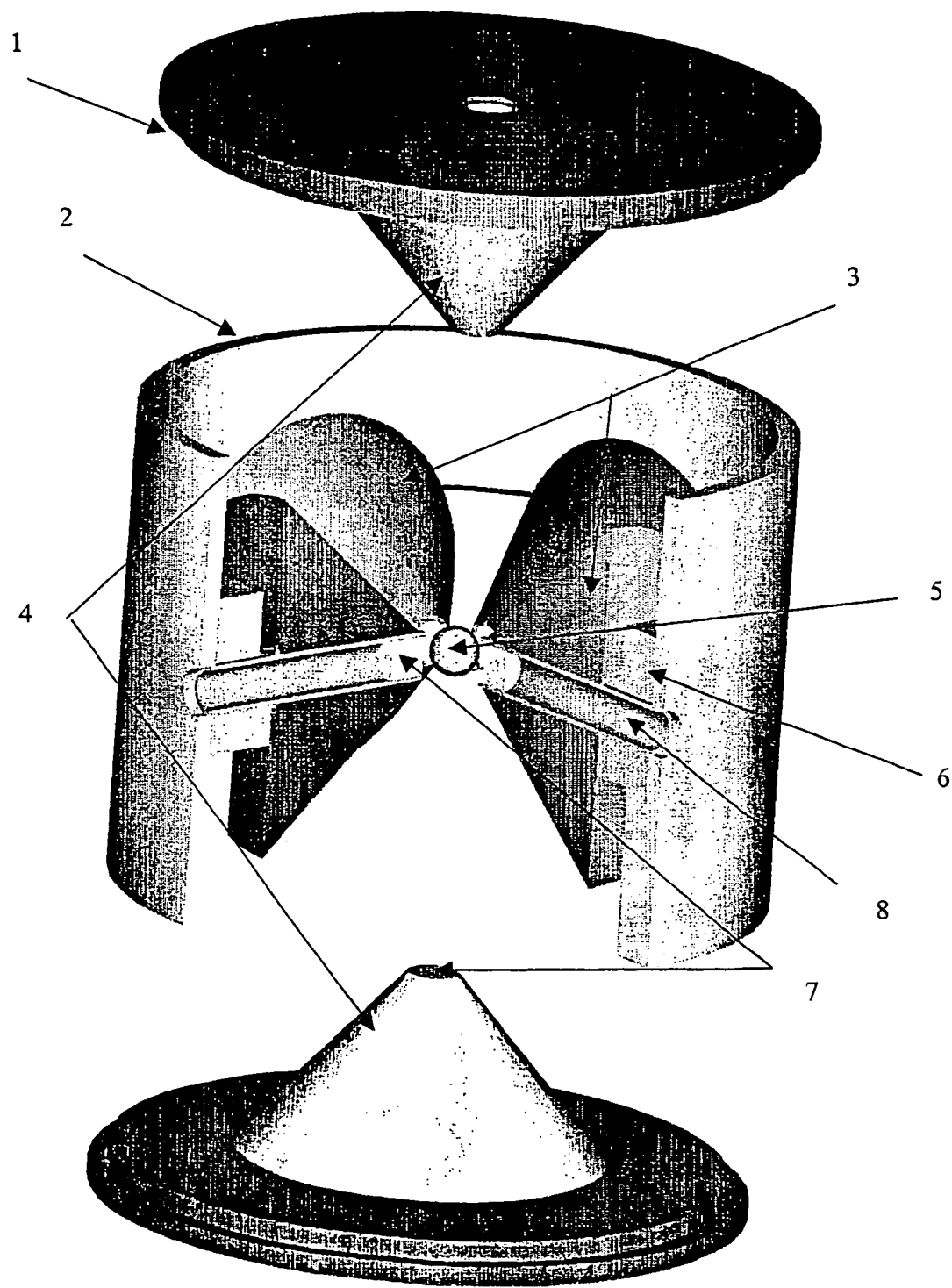
FIG. 1 shows complete view of the first embodiment of the inertial sensing system with:
1) End cap
2) Support structure
3) Horizontal pair of electromagnets
4) Vertical pair of electromagnets
5) Ferromagnetic inertial mass
6) Holding structure for the horizontal electromagnets
7) High precision position sensors
8) Coil armature
Figure 2:
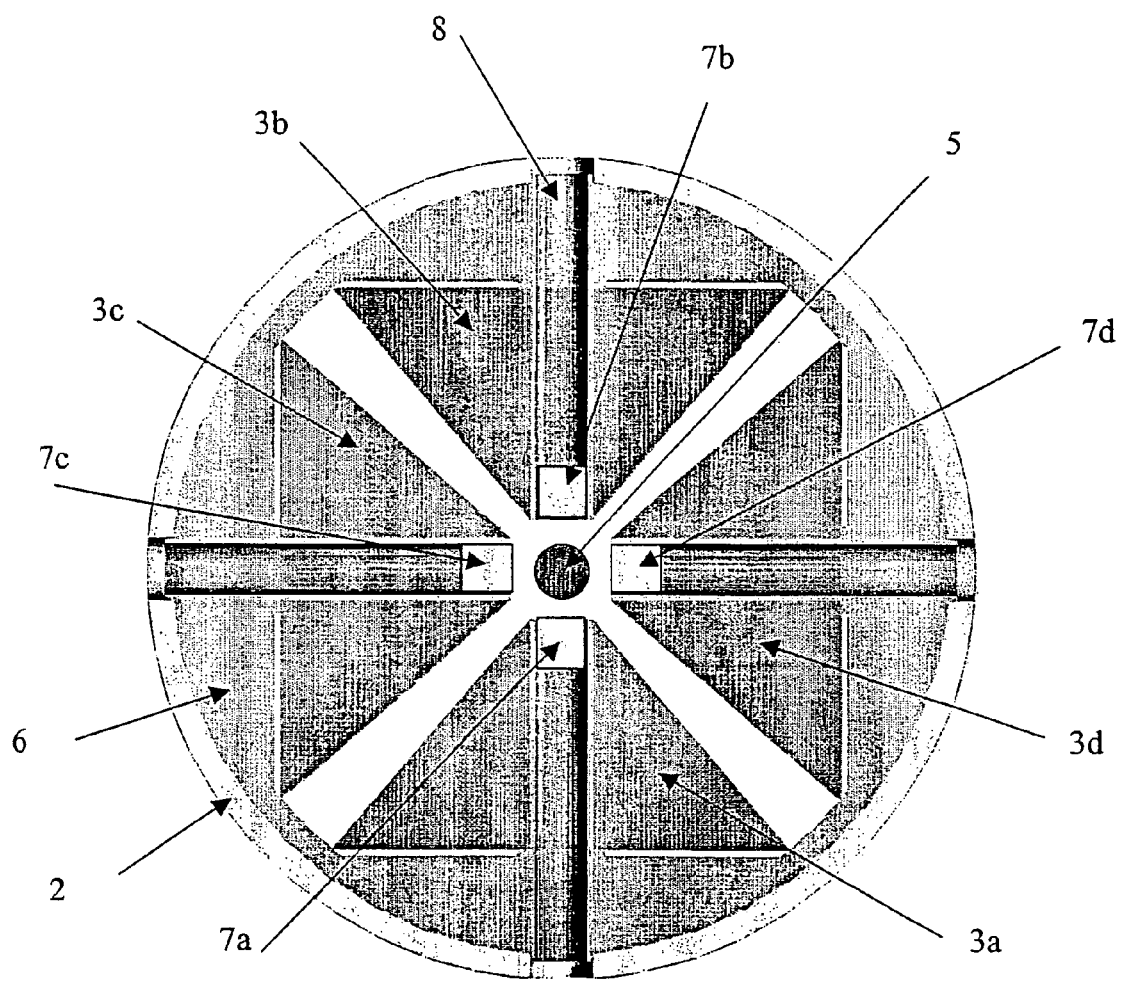
FIG. 2 shows a horizontal cut (O,X,Y) of the first embodiment of the inertial sensing system with:
3a), 3b), 3c), 3d) Coils
7a), 7b), 7c), 7d) High precision position sensors
Figure 3:
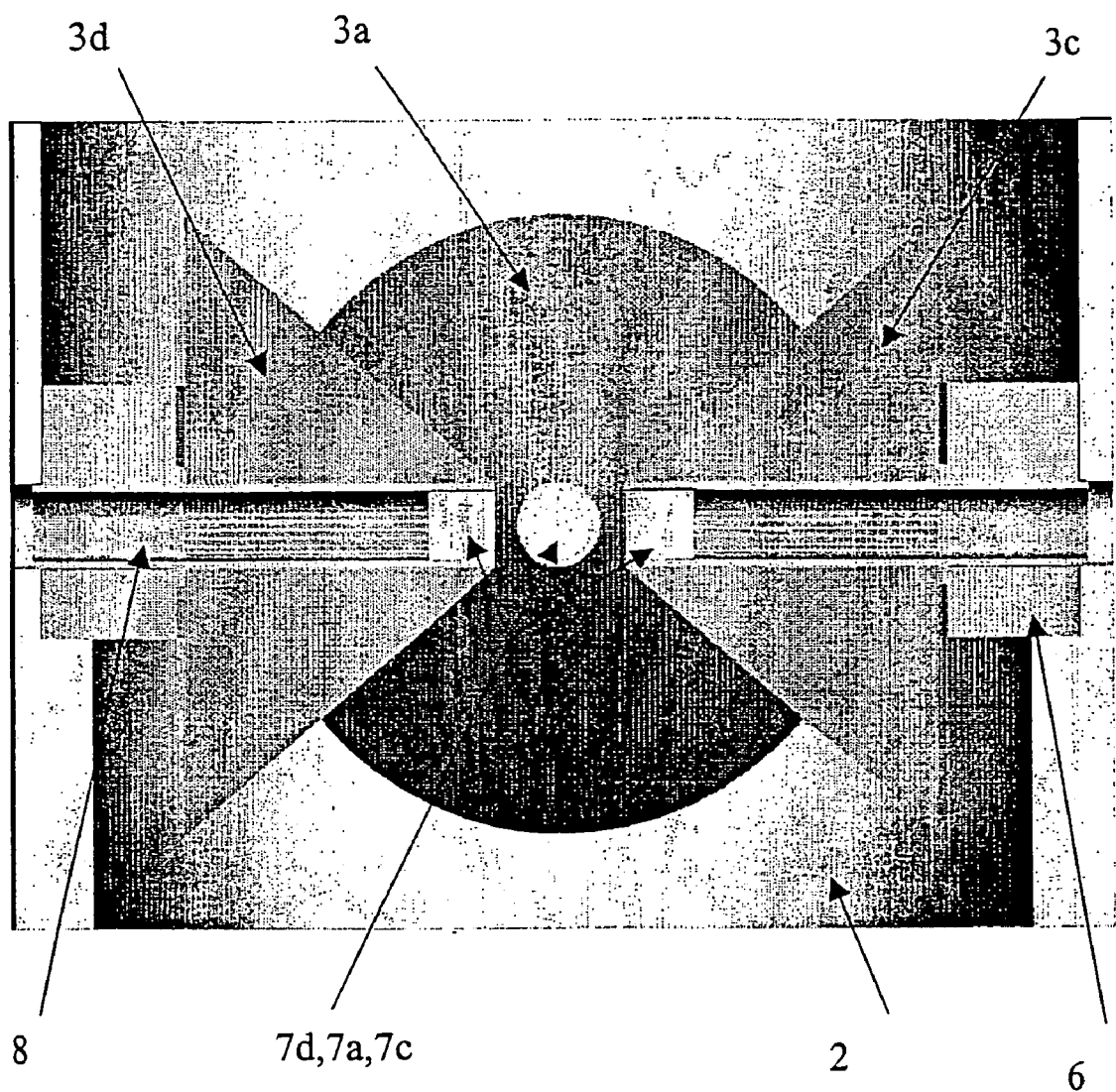
FIG. 3 shows a vertical cut (O,Y,Z) of the first embodiment of the inertial sensing system.

Implementation 1a (FIG. 1, FIG. 2, FIG. 3)

Six electromagnets 3, 4, 3a, 3b, 3c, 3d are diametrically disposed in pairs along three orthogonal axis.

A small size ferromagnetic inertial mass 5 is levitated and its position controlled along three axis.

In this first embodiment (FIG. 4), the outside frame 4 is an empty cylinder of homogeneous ferromagnetic material.

By convention, we shall call O its center of gravity and Oz its axis.

Also by convention we shall call Ox and Oy two axis located in the plane perpendicular to Oz and containing O, Oxyz being a direct trihedral.

In this first embodiment the inertial mass 5 is a spherical or cylindrical body of homogeneous ferromagnetic material.

When it is in its original position, the center of this inertial mass is located in O.

Circular covers or end caps 1 made of the same ferromagnetic material close both ends of the cylindrical outside frame 2.

Therefore the volume inside the frame 2 of this device (inner volume), is fully protected from any measurement bias caused by changes of outside magnetic conditions.

Seals between the cylinder frame 2 and its covers 1 close hermetically this inner volume which is equipped with a port (not represented in the figure) in order to be put under vacuum whenever necessary for eliminating any bias due to atmospheric convection and friction.

Centered respectively on the Ox and Oy and located symmetrically with regard to point O, two sets of coils 3a, 3b and 3c, 3d, each set made of two symmetrical coils 3 facing each other create opposed magnetic fields.

Inside each coil 3, 4, 3a, 3b, 3c, 3d, at its inner end, an axial sensor 7 (inductive, optical or capacitive), centered on axis Ox or Oy and very rigorously positioned at pre-set distance from the Oz axis, provides instant and highly accurate measurements (<μm) of its distance to the inertial mass 5 along Ox or Oy as a function of time.

The two measurement values given by the set of sensors centered, for example, on Ox, provide the basis for a differential measurement of the displacement of the inertial mass 5 along the Ox axis and the same can be said for the set centered on Oy.

A third set of two coils 4 with their corresponding axial sensors 7 is centered on the Oz axis and both coils are located in rigorously symmetrical positions with regards to O. It operates exactly like the two other sets 3 described above.

The following considerations are also applied to implementation 1b and implementation 2:

The distance to the inertial mass of each sensor is sent in the form of a variable tension signal which, in order to remove any unwanted residual noise, is fed to a filtering module.

The filtered signal in then converted to digital values in an AD converter and the information is multiplexed and processed in a digital controller.

The digital controller:

1°) Calculates the displacement of the inertial mass as time functions measured along the axis Ox, Oy and Oz.

2°) Calculates the counterbalancing force necessary in order to bring the inertial mass back to its initial position, with its center in O, thus insuring its levitation.

3°) Sends the necessary instructions to a feedback loop commanding the current to the corresponding coils.

4°) Calculates the value of the time function representing the external disturbance from the knowledge of the time functions representing the displacement of the inertial mass and the counterforce applied to it.

5°) If this inertial sensing system is used as a seismometer, initial conditions being known, this information can be also taken by the digital controller to calculate both the speed of the seismic wave and the corresponding ground movements as a function of time.

A magnet can be introduced in the electromagnet which is supporting the weight of the inertial mass, in order to compensate it. Therefore power consumption can be reduced.

Figure 4:
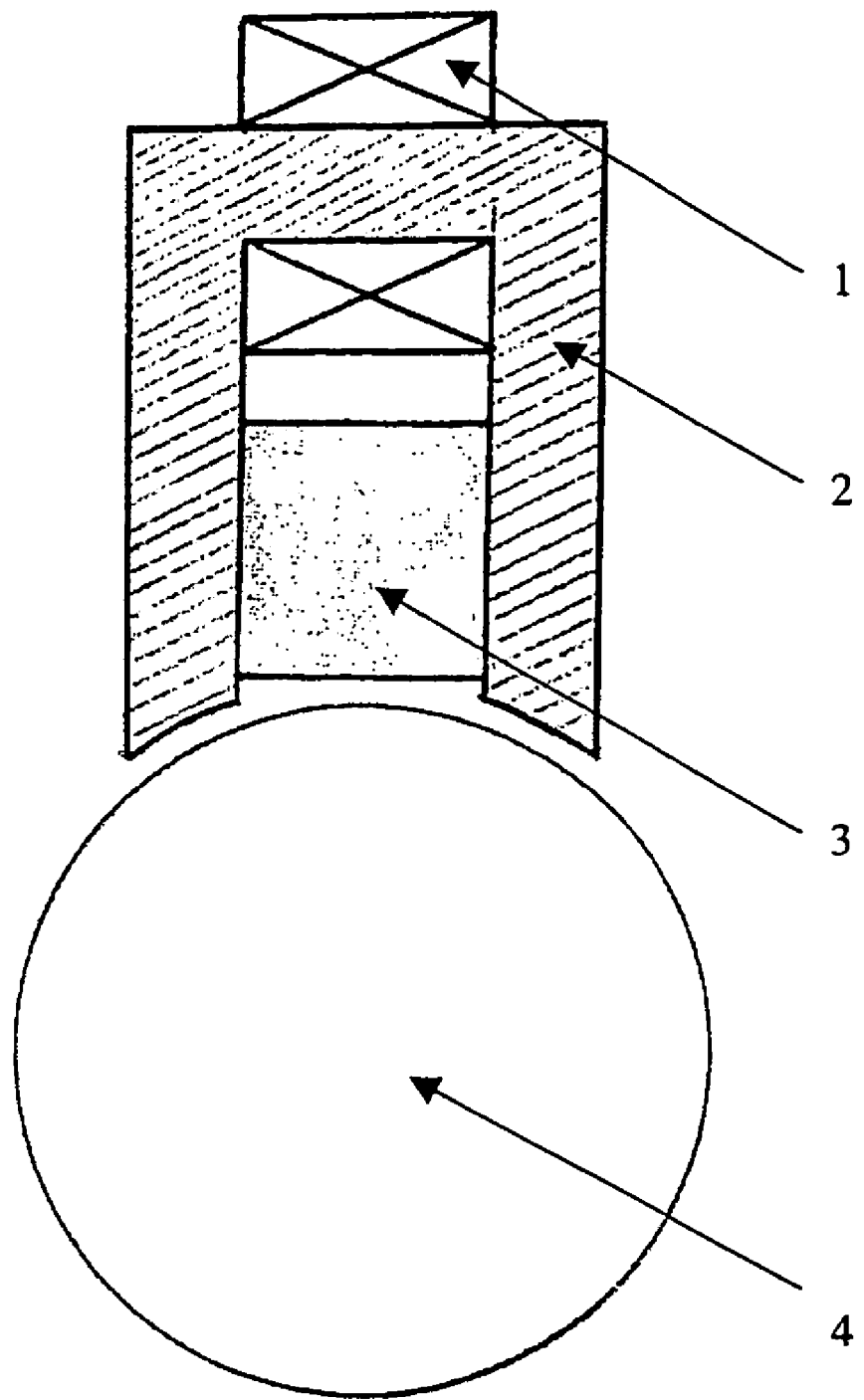
FIG. 4 shows a variant of the electromagnets used in the first embodiment with:
1) Coil
2) Laminated ferromagnetic core
3) Position sensor
4) Inertial mass

A lock-in amplifier can be added to the filtering module in order to increase the signal to noise ratio for low frequencies Implementation 1b (FIG. 4)

The implementation 1b is equivalent to implementation 1a, expect for the shape of the six electromagnets. The six electromagnets considered in this implementation have a horseshoe shape (FIG. 4) in order to have less magnetic losses than the electromagnets described in implementation 1a.

Figure 5:
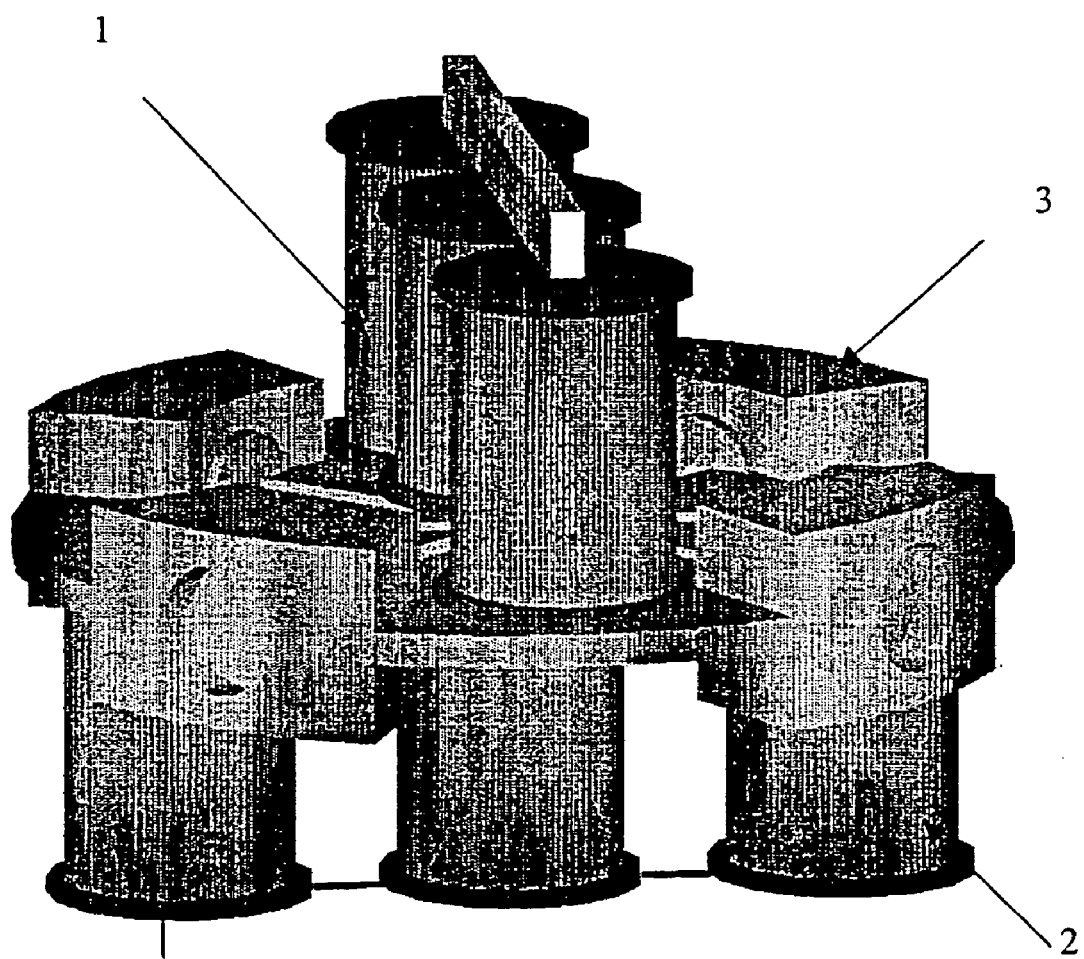
FIG. 5 shows the second embodiment of the inertial sensing system with:
1) Upper set of electromagnets (3 coils)
2) Lower set of electromagnets (3 coils)
3) Position sensing system holder
Figure 6:
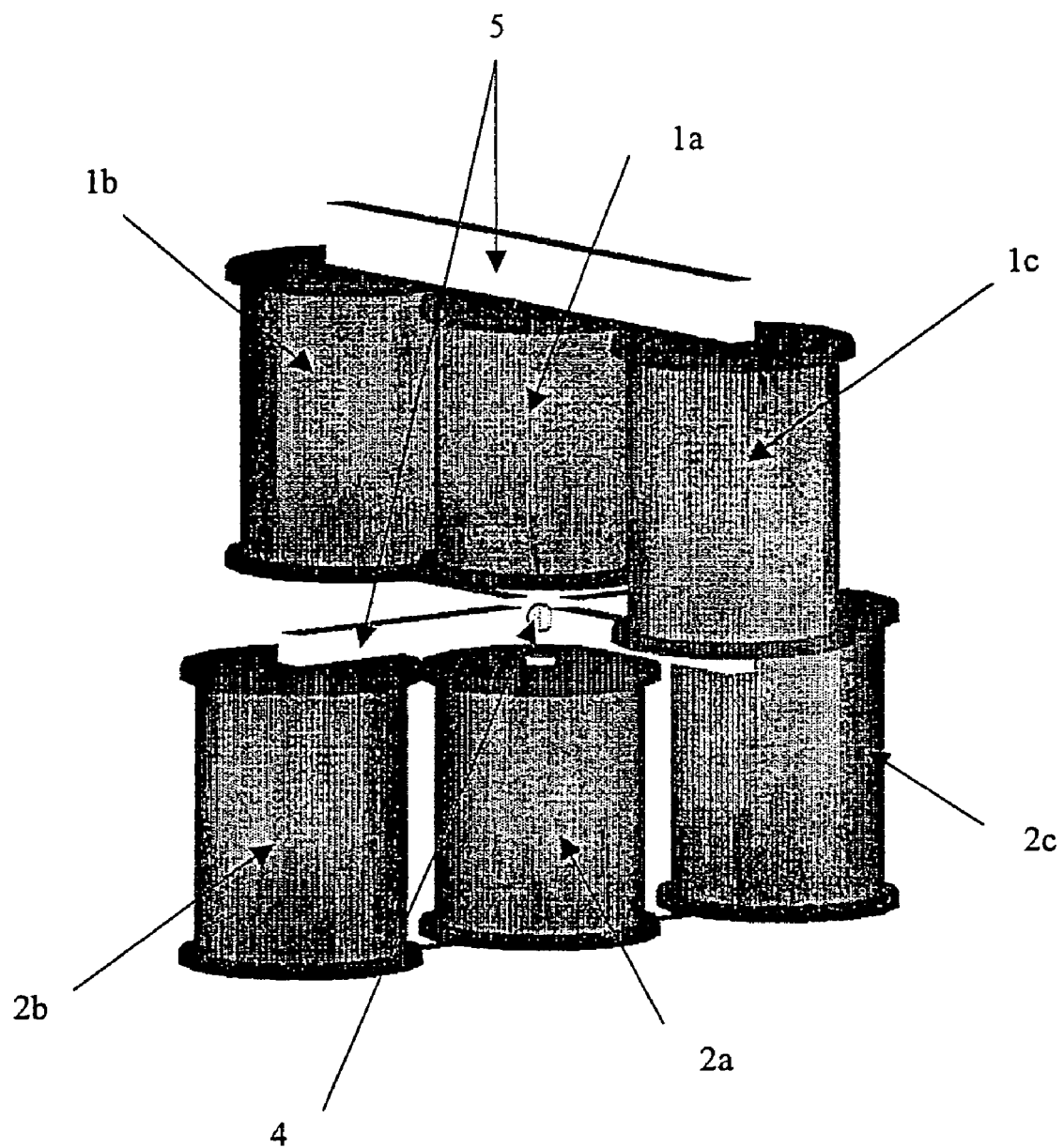
FIG. 6 shows the second embodiment of the inertial sensing system without the position sensing system with:
1a), 1b), 1c), 2a), 2b), 2c) Coils
4) Inertial mass
5) Magnetic permeable cores
Figure 7:
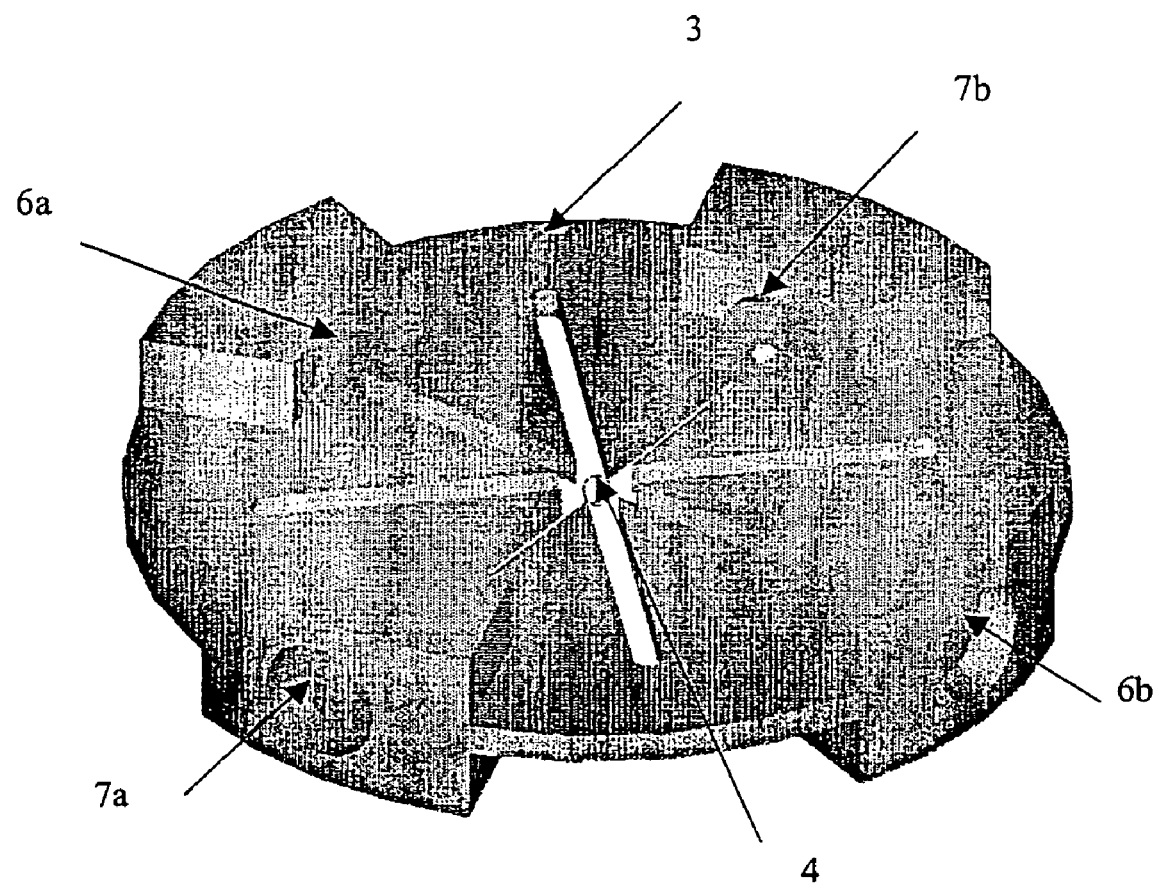
FIG. 7 shows the position sensing system of the second embodiment of the inertial sensing system and its inertial mass with:
6a) Laser diode 1
6b) 4 segments photodiode 1
7a) Laser diode 2
7b) 4 segments photodiode 2

Implementation 2 (FIG. 5, FIG. 6, FIG. 7)

As for implementation 1a, a magnetic levitation of a spherical or cylindrical inertial mass 4 is performed with three degrees of freedom control. Six vertically arranged electromagnets 1, 2 create opposing forces in three orthogonal directions. Magnetic permeable cores 5 bring the magnetic field near the inertial mass 4, reducing magnetic losses. The position sensing system is composed of two laser diodes 6a, 7a and two 4-segments photodiodes 6b, 7b orthogonally placed in a horizontal plane between the upper electromagnets 1 and the lower electromagnets 2. Therefore, positions x, y, z of the inertial mass 4 can be measured. Afterwards, the x, y positions are rotated by 45 degrees, filtered and fed back to a digital controller as well as the z position.

Horizontal arrangement of the electromagnets 1b, 1c, 2b and 2c (same plane of the sensing system) could be a variant for this implementation. In order to spin the inertial mass 4, a motor function can be added to the device by superposing a two-phase sinusoidal or square signal to the control current of the electromagnets 1b, 1c, 2b and 2c.

Advantages of the Present Invention

The invention proposed has a symmetrical behavior along three axis, therefore external disturbances in three orthogonal directions can be detected. Since the inertial mass is magnetically levitated with active control, parameters like stiffness and damping can be varied over a large range in order to adjust the natural frequency. Moreover when this inertial sensing system is used as a seismometer, we can even define precisely triggers that characterize the limits between the borders of different seismic events and this way the sensors can vary its damping and spring constant according to the nature of the seismic event. This design can be made very compact thanks to the use of only one single sensor.

Thanks to differential measurements the precision of the measurements is high and not affected by temperature variation Both position signals and current signals can be used to determine the external disturbance.

Moreover, the whole device is magnetically shielded and thus not affected by ambient magnetic waves.

If we apply the vacuum inside the system, we can avoid the disturbance of the buoyancy forces and enhance the precision of the measurements. The addition of the motor function will transform the device in a gyroscope.

Applications

This invention can be used as an accelerometer, a gravimeter, a tiltmeter or a seismometer. With the addition of the motor function one can use it as a gyroscope. Application fields are seismology, inertial navigation, structural monitoring and geology.

The invention claimed is:

1. An inertial sensor based on the magnetic levitation of a ferromagnetic spherical or cylindrical inertial mass and comprising:

six electromagnets diametrically disposed in pairs along three orthogonal axis, said pairs of electromagnets constituting means for levitation and differential actuation of said inertial mass, six position sensors diametrically disposed in pairs along three orthogonal axis, said pairs of position sensors constituting means for differential measurements of the position of said inertial mass, wherein said pair of electromagnets, together with said pairs of position sensors and said inertial mass, constitute an active magnetic bearing which give the means for:

controlling the position of said inertial mass along three independent axis, creating, for any of said independent axis, restoring forces that can be oriented in any of the two directions of said independent axis, wherein said active magnetic bearing is enclosed in an outer frame made of homogeneous ferromagnetic material; said outer frame constituting a magnetic shielding of said inertial sensor, wherein said outer frame of said inertial sensor is hermetically sealed in order to offer the possibility of creating and keeping vacuum inside said outer frame, wherein a lock-in amplifier is used for the signal conditioning of said position sensors.

2. An inertial sensor based on the magnetic levitation of a ferromagnetic inertial mass and comprising:

six coils which axis are vertical and parallel to each other, magnetic permeable cores used to guide the magnetic field from said coils to the vicinity of said inertial mass, a position sensing system composed of two laser diodes and two four segments photodiodes, wherein said laser diodes as well as said photodiodes are placed in the same horizontal plane, wherein said position sensing system constitutes means for differential measurements of the position of said inertial mass, wherein the combination of said coils together with said magnetic permeable cores constitutes three independent differential actuators, providing means for levitation and differential actuation of said inertial mass along three independent axis, wherein said coils, together with said position sensing system and said inertial mass, constitute an active magnetic bearing which gives the means for:

controlling the position of said inertial mass along three independent axis creating, for any of said independent axis, restoring forces that can be oriented in any of the two directions of said independent axis, wherein said active magnetic bearing is enclosed in an outer frame made of homogeneous ferromagnetic material; said outer frame constituting a magnetic shielding of said inertial sensor, wherein said outer frame of said inertial sensor is hermetically sealed in order to offer the possibility of creating and keeping vacuum inside said outer frame wherein a lock-in amplifier is used for the signal conditioning of said position sensors in said position sensing system.

3. A method of using an inertial sensor according to claim 1, wherein the inertial sensor is used as a three dimensional non-contact accelerometer or as a three dimensional non-contact seismometer.

4. A method of using an inertial sensor according to claim 2, wherein the inertial sensor is used as a three dimensional non-contact accelerometer or as a three dimensional non-contact seismometer.

5. A method of using an inertial sensor according to claim 1, wherein the inertial sensor is used as a three dimensional non-contact tiltmeter (inclinometer).

6. A method of using an inertial sensor according to claim 2, wherein the inertial sensor is used as a three dimensional non-contact tiltmeter (inclinometer).

7. A method of using an inertial sensor according to claim 1 comprising a motor function implemented by applying a rotating magnetic field to, at least, two of said pairs of electromagnets in order to spin said inertial mass around the main axis of inertia of said inertial mass.

8. A method of using an inertial sensor according to claim 2 comprising a motor function implemented by applying a rotating magnetic field to, at least, two of said differential actuators in order to spin said inertial mass around the main axis of inertia of said inertial mass.

9. A method of using an inertial sensor according to claim 1, wherein the inertial sensor is used as a three dimensional non-contact gyroscope.

10. A method of using an inertial sensor according to claim 2, wherein the inertial sensor is used as a three dimensional non-contact gyroscope.

11. A method of using an inertial sensor according to claim 1, wherein the inertial sensor is used as a three dimensional non-contact gravimeter.

12. A method of using an inertial sensor according to claim 2, wherein the inertial sensor is used as a three dimensional non-contact gravimeter.

* * * * *